(12) United States Patent
Richter (10) Patent No.: US 11,469,616 B2
(45) Date of Patent: Oct. 11, 2022

(54) WIRELESS POWER TRANSFER ARRANGEMENT

(71) Applicant: DELTA ELECTRONICS (THAILAND) PUBLIC CO., LTD., Samutprakarn (TH)

(72) Inventor: Ulrich Richter, Freiburg (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 0 days.

(21) Appl. No.: 16/865,326

(22) Filed: May 2, 2020

(65) Prior Publication Data
US 2020/0358317 A1 Nov. 12, 2020

(30) Foreign Application Priority Data
May 8, 2019 (EP) .................................... 19173372

(51) Int. Cl.
*H02J 50/12* (2016.01)
*H02J 50/80* (2016.01)
(Continued)

(52) U.S. Cl.
CPC .............. *H02J 50/12* (2016.02); *B60L 53/12* (2019.02); *H01F 27/28* (2013.01); *H01F 38/14* (2013.01);
(Continued)

(58) Field of Classification Search
CPC .... H02J 50/12; H02J 50/80; H02J 7/02; H02J 50/70; B60L 53/12; H01F 27/28;
(Continued)

(56) References Cited

U.S. PATENT DOCUMENTS

| 8,947,041 B2 * | 2/2015 | Cook ................. G06K 19/0702 320/108 |
| 2004/0218406 A1 * | 11/2004 | Jang ....................... H02J 50/70 363/37 |

(Continued)

OTHER PUBLICATIONS

European Search Report dated Jun. 11, 2019, 7 pages.

*Primary Examiner* — Jared Fureman
*Assistant Examiner* — Michael J Warmflash
(74) *Attorney, Agent, or Firm* — Vector IP Law Group LLC; Robert S. Babayi (57) ABSTRACT

In a wireless power transfer arrangement (1) power is wirelessly transferred from a primary side (2) to a secondary side (3) across an airgap (8) by means of a primary resonator (6) that generates a magnetic field (9) and a secondary resonator (10) that receives the power by picking up the magnetic field (9). The secondary side (3) includes an output stage (11) that receives the AC power provided by the secondary resonator (10) and generates a DC output (13) to be provided to a load. A current sensing arrangement (18) senses the AC current flowing from the secondary resonator (10) to the output stage (11) and provides a current sense signal (16) to a power transfer controller (15) that controls the power transfer of the wireless power transfer arrangement (1) based on the current sense signal (16). And the current sense signal (16) is provided to a switching controller (20) that controls the switching of a synchronous rectifier of the output stage (11) that converts the AC power (12) provided by the secondary resonator (10) to the DC output (13).

16 Claims, 3 Drawing Sheets

(51) Int. Cl.
*B60L 53/12* (2019.01)
*H01F 27/28* (2006.01)
*H01F 38/14* (2006.01)
*H02J 7/02* (2016.01)
*H02M 3/335* (2006.01)

(52) U.S. Cl.
CPC ............... H02J 7/02 (2013.01); H02J 50/80 (2016.02); H02M 3/33592 (2013.01)

(58) Field of Classification Search
CPC ... H01F 38/14; H02M 3/33592; H02M 7/219; H02M 1/126; H02M 2001/0009; H02M 2007/2195; Y02T 90/14; Y02T 10/7072; Y02T 10/70
See application file for complete search history.

(56) References Cited

U.S. PATENT DOCUMENTS

| | | | |
|---|---|---|---|
| 2010/0052637 A1* | 3/2010 | Lorentz | G01R 19/0092 323/282 |
| 2011/0304216 A1* | 12/2011 | Baarman | H02J 50/402 307/104 |
| 2017/0187230 A1* | 6/2017 | Tschirhart | H02J 7/025 |
| 2018/0294727 A1* | 10/2018 | Klein | H02M 3/1582 |
| 2019/0157907 A1* | 5/2019 | Sugiyama | H02J 50/80 |
| 2019/0267841 A1* | 8/2019 | Richter | B60L 53/12 |
| 2019/0267842 A1* | 8/2019 | Richter | H02J 50/12 |
| 2019/0334453 A1* | 10/2019 | Buchmann | H02M 7/483 |
| 2020/0358317 A1* | 11/2020 | Richter | H02J 7/02 |

* cited by examiner

WIRELESS POWER TRANSFER ARRANGEMENT

TECHNICAL FIELD

The invention relates to a wireless power transfer arrangement for a wireless power transfer from a primary side across an airgap to a secondary side by inductive coupling, wherein the primary side includes a power input for receiving an input power, an input stage for converting the input power to a primary AC power and a primary resonator for receiving the primary AC power and inducing a magnetic field, the secondary side includes a secondary resonator for converting the power received through the magnetic field to a secondary AC power and an output stage for converting the secondary AC power to a DC output power, the output stage includes a controllable rectifier for converting the secondary AC power to the DC output power, the wireless power transfer arrangement includes a current sensing arrangement adapted to produce a current sense signal, a power transfer controller adapted to control the wireless power transfer based on the current sense signal and a control arrangement for controlling the controllable rectifier. The invention further relates to a secondary side for such a wireless power transfer arrangement, a current sensing device for such a wireless power transfer arrangement and a corresponding method for a wireless power transfer.

BACKGROUND ART

Electrical energy is used in many different applications. To power electrically driven devices, items or objects that are not permanently connected to a source of electrical power, such devices, items or objects are often equipped with one or more batteries that are used to store energy for powering such a device, item or object when it is not connected to a power source. Examples are mobile devices such as cell phones, PDAs (personal digital assistants) and the like, automotive vehicles such as cars, lorries, motorbikes, trains, boats, ships, planes, helicopters and the like but also industrial vehicles such as forklifts, AGVs (automated guided vehicles), cleaning machines, elevators and the like or electrically operated equipment for lifting, displacing or transporting goods of any kind. All these devices, items or objects usually include a battery for operating it.

Whereas the primary side most often is mounted stationary and connected to a power source the secondary side is usually arranged within a mobile device as mentioned above that is placed nearby the primary side only occasionally for charging its battery or otherwise supplying it with power.

Whereas lead-acid batteries have often been used to store power for driving such devices, items or objects, Li-Ion batteries are now often used for this purpose. One of the reasons is that they may be charged with much higher c-rates. Lead-acid batteries may be charged with a c-rate of about 0.1c to 0.2c. This means that a 600 Ah lead-acid battery may be charged with a current of about 60 Amperes to 120 Amperes and would require about 5 to 10 hours. Li-Ion batteries may be charged with a c-rate of up to 1c wherefore a 600 Ah Li-Ion battery may be charged with a current of up to 600 Amperes which reduces the charging time down to about 1 hour. In addition, Li-Ion batteries can be charged occasionally without doing damage to the battery which would happen with Lead-acid batteries when applying multiple short charging cycles for just a small number of minutes.

The high charging currents with Li-Ion batteries may however cause problems with a wire-based charger where the charging current is fed from the power source to the battery via a cable connection where the cable is connected to the source and/or the battery by connectors. The high charging currents would require a charging cable with a large copper diameter and heavy duty connectors. Accordingly, the charging cables are difficult to handle and the connectors would wear out fast. With an occasional charging such connectors would wear out within weeks.

To overcome the problems with the charging cables the charging of such batteries often is done by wireless power transfer. Such a wireless power transfer system is called an inductive power transfer (IPT) system in case the power is transferred wirelessly by inductive coupling. Some IPT Systems do also work with loosely coupled inductors.

The primary side of such a wireless power transfer system includes an input stage and a primary pad where the input stage is connected to a power source and typically converts the input power to an AC input power suited as an input for the primary pad which induces a more or less directed magnetic field. The secondary side of such a wireless power transfer system includes a secondary pad and an output stage where the secondary pad is positioned within the magnetic field produced by the primary and the output stage includes a rectifier that converts the AC power received from the secondary pad to a DC current that is used for charging the battery or for powering another kind of load.

In order to control the power transfer, it is known to control the input stage such that the power transferred across the airgap and converted to a DC power by the output stage meets certain criteria. Typically, the load current shall meet a set-value specified by the load, for example a load current specified by the battery management system of a battery to be charged. Accordingly, the controller usually produces the control signals for the input stage based on a measurement of the load current. The current may for example be sensed with a shunt resistor or a current transducer at the output of the wireless power transfer system.

In order to reduce losses in the secondary rectifier a synchronous rectifier (SR) is usually used. The control signals for the synchronous rectifier are typically derived by sensing the voltage across the synchronous switches. In case of MOSFETs as the synchronous switches a switch is switched ON if the measured drain-source voltage is below a few millivolts (mV) and it is switched OFF as soon as the drain-source voltage is close to zero volts (V). Control circuitry implemented as integrated circuits (IC) are commonly used for such an SR control.

However, in a high magnetic AC field environment as for example in a wireless power transfer system for charging the battery of an electric vehicle, it is rather difficult to detect a few mV. Accordingly, detection errors may occur and lead to erratic switching.

Document U.S. Pat. No. 8,947,041 B2 discloses such a control method. It discloses a wireless power transceiver (500) for wireless exchange of power from one wireless chargeable device (primary side) to another wireless chargeable device (secondary side). The power transceiver includes a transmitter (308T) with a power conversion circuitry and a transmit antenna (306T) to induce a magnetic field and it includes a receiver (308R) with a receive antenna (306R) to receive the energy transferred through the magnetic field and an output power convers ion circuitry to provide a DC power to a load (battery 310R or host device electronics). The output power conversion circuitry further includes a synchronous rectifier (Q2, Q2'), a frequency generator and control (322R) for controlling the synchronous rectifier (Q2, Q2') as well as for controlling the mode of operation (i. e. either transmit or receive mode). If the bidirectional output power conversion circuit operates in the receive mode, the synchronous rectifier (Q2, Q2') is controlled based on the voltage sensed on the rectifier switches (col. 9, l. 26).

One of the problems in this connection is the measurement of the load current. The load current is a DC current and DC currents may not be measured passively or only with a high effort such as for example by using active transducers or the like thereby increasing costs. Another possibility to measure a high DC current is the usage of a suitable shunt which however increases losses.

SUMMARY OF THE INVENTION

It is the object of the invention to create a wireless power transfer arrangement pertaining to the technical field initially mentioned, that enables an enhanced SR control resulting in less switching errors and having reduced losses. It is a further object of the invention to create a secondary side for such a wireless power transfer arrangement, a current sensing arrangement for such a wireless power transfer arrangement and a method for a wireless power transfer pertaining to the technical field initially mentioned.

The solution of the invention regarding the wireless power transfer arrangement is specified by the features of claim 1. According to the invention the current sensing arrangement includes a current sensing device adapted to produce the current sense signal by sensing an AC current flowing from the secondary resonator to the output stage and in that the control arrangement is adapted to control the controllable rectifier based on the current sense signal.

I. e. the control arrangement produces control signals for controlling the controllable rectifier such as for example the control signal for switching the switches of a synchronous rectifier ON and OFF. And the control arrangement produces these control signals in consideration of the current sense signal which corresponds to the sensed AC current. The current sense signal is for example a copy of the sensed AC current on a different scale.

Depending on the design of the current sensing arrangement, its output may either be a current or a voltage. Accordingly, the current sense signal may generally either be a current or a voltage. It is further to note that if the current sensing arrangement outputs a current it may be easily transformed to a voltage as the current sense signal. Or if the current sensing arrangement outputs a voltage it may be easily transformed into a current as the current sense signal.

Further, it is to note that, as the sensed AC current generally corresponds to the load current, the current sense signal also corresponds to the load current and is therefore well suited for power transfer control.

Accordingly, it is not a small voltage that has to be sensed but it is a high current that is sensed. But sensing a high current in a high magnetic AC field environment is much less error-prone than sensing a small voltage in such an environment. Detection or sensing errors may therefore be avoided or at least reduced which results in no or a reduced number of switching errors.

And since the sensed current is an AC current it may be sensed in a passive way resulting in reduced losses.

The term AC current hereinafter denotes the AC current flowing from the secondary resonator to the output stage unless indicated otherwise or clear within the given context for one skilled in the art.

The term control arrangement may refer to an arrangement that exclusively controls the synchronous rectifier in the secondary. However, it may not necessarily refer to such an exclusive control arrangement. The control arrangement may also control other aspects of the wireless power transfer arrangement. The control arrangement may for example also perform the control of the power transfer from the primary to the secondary side of the wireless power transfer arrangement. The wireless power transfer arrangement may however also include a separate controller for controlling the power transfer from the primary to the secondary side of the wireless power transfer arrangement and/or other aspects of the arrangement.

In a preferred embodiment of the invention, the current sensing arrangement is adapted to produce the current sense signal to be representative of the DC output current of the output stage, i. e. the current that is provided to a load connected to the output stage. In this case, control of the power transferred from the primary to the secondary may accordingly also be based on that current sense signal produced by the current sensing arrangement. The term being representative in this connection means that it shall be possible to infer from the current sense signal to one or more properties of the DC output current provided to the load. For example, certain characteristics of the current sense signal may reflect certain characteristics of the DC output current such as its magnitude. In a simple and therefore preferred embodiment the current sense signal is produced to be proportional to the DC output current. The current sense signal may also include an offset. The current sense signal may however also be produced to have for example an exponential relation to the magnitude of the DC output current which is used to control the power transfer. The current sense signal may actually have any desired, suited or otherwise eligible relation to the DC output current as long as it is clearly defined and it is possible to determine the desired characteristic of the DC output current, for example its magnitude. It would for example also be possible to produce the current sense signal as an encoded signal that is transmitted to the power transfer controller, decoded by the power transfer controller and then used to control the power transfer.

Power transfer control may however also be based on a separate current, voltage or power measurement at the same or another suitable position of the wireless power transfer arrangement. In this case, the current sense signal may not necessarily be representative of the DC current provided to a load. It would be sufficient that the current sense signal is produced by the current sensing arrangement such that the phasing of the current sense signal is representative of the phasing of the output current in order to correctly produce the control signals for controlling the controllable rectifier. The term being representative in this connection means that the phasing of the current sense signal corresponds or is even identical to the phasing of the output current.

The power transfer controller is preferably implemented as a part of the secondary side which is, as outlined above, integrated into a mobile or automotive device or the like together with the load such as for example a battery. And as the mobile or automotive device is placed nearby the primary side only occasionally for charging its battery or otherwise supplying it with power, the control signals for the power transfer control have to be transmitted from the secondary side to the primary side. Accordingly, a cable connection might be established to enable communication between the primary and the secondary side. However, as the power transfer itself is wireless, it is preferred that also the transmission of the control signals from the power transfer controller to the primary side is done in a wireless manner such that the establishment of a cable connection may be avoided.

Accordingly, in a preferred embodiment of the invention, the primary side as well as the secondary side includes a transceiver for wireless communication with each other. Preferably, the communication link is a radio communication link such as LTE, UMTS, GSM, WLAN, Bluetooth or the like or any other suitable radio communication technology. Since the primary and the secondary side are arranged in the vicinity of each other during power transfer the communication technology preferably is a short range communication technology such as WLAN or Bluetooth etc. Where a radio communication technology offers different frequency ranges at the location of the system each of these locally available frequency ranges may be chosen. If for example the WLAN technology is to be used, either the 2.4 GHz and/or the 5 GHz band may be used. As each region in the world may identify certain frequency bands that may be used freely in a given, usually low transmission power range, a radio communication technology that uses such free frequency bands is preferably used.

In a preferred embodiment of the invention, the current sensing device includes a first stage current sensing device and a second stage current sensing device linked to an output of the first stage current sensing device.

The first and second stage current sensing devices for example include a current transformer, a current sensor using the hall effect or other current sensors for sensing an AC current.

The first stage current sensing device senses the AC current and produces an output current or voltage. The term linked to the output of the first stage current sensing device in this connection means that the second stage current sensing device senses the output current or voltage produced by the first stage current sensing device to produce the current sense signal as its output current or voltage.

As the sensed AC current is—after rectification—used to charge a high capacity battery with high c-rates, the AC current to be sensed is a high current having for example a value of up to several hundreds of Amperes or even some kilo-Amperes. Accordingly, the first stage current sensing device is preferably adapted to be suited for such high currents.

In a preferred embodiment of the invention, both the first stage and the second stage current sensing devices include a current transformer for sensing the AC current flowing from the secondary resonator to the output stage. Current transformers are widely used in such applications and may be manufactured for the high ampere ratings required at reasonable costs.

Accordingly, the first stage current sensing device includes a first current transformer and the second stage current sensing device includes a second current transformer.

As known, a current transformer usually includes a magnetic core, a primary winding having a number of turns and through which the current flows that is to be sensed and a secondary winding having a number of turns where a burden resistor is connected between the ends of the secondary winding and where the voltage across the burden resistor represents the amount of current flowing in the primary winding. The ratio of the number of turns in the secondary winding to the number of turns in the primary winding is called the conversion ratio.

The first current transformer preferably has a conversion ratio between 10:1 and 80:1. The conversion ratio is preferably between 15:1 and 50:1 and even more preferably between 20:1 and 30:1. The conversion ratio of the first current transformer is denoted hereinafter as the first conversion ratio.

Generally, the first current transformer has a low number of turns in the primary. If the number of turns in the primary is for example three, the number of turns in the secondary is chosen to be somewhere between 30 and 240.

The second current transformer preferably has a conversion ratio between 20:1 and 600:1, preferably between 100:1 and 300:1 and more preferably between 150:1 and 250:1. The conversion ratio of the second current transformer is denoted hereinafter as the second conversion ratio. Generally, the second current transformer has a low number of turns in the primary. If the number of turns in the primary is for example three, the number of turns in the secondary is chosen to be somewhere between 60 and 1800.

The conversion ratios of both current transformers will multiply. This helps to convert the high primary current to a low current signal. The first conversion ratio and the second conversion ratio are therefore preferably chosen such that the current sensing device has an overall conversion ratio between 100:1 and 30'000:1, preferably between 500:1 and 15'000:1 and more preferably between 2'000:1 and 10'000:1. A conversion ratio of 5'000:1 can therefore be achieved for example with a first conversion ratio of 25:1 and a second conversion ratio of 200:1.

The conversion ratios of both current transformers may be chosen to result in high accuracy current sensings. Thereby, several aspects have to be taken into consideration such as the metering precision at the expected current rating or that the output of the first current transformer matches the input of the second current transformer and other aspects such as for example availability of commercial products and their current ratings.

The conversion ratios of both current transformers may however also be chosen to be higher or lower than those mentioned above if less measurement accuracy is acceptable.

In a preferred embodiment, the primary of the first current conductor includes just a single winding. Or in other words, the conductor carrying the AC current to be sensed is just fed through the core of the first current transformer. In order to achieve an overall conversion ratio of about 5000:1 and high precision current sensings, the conversion ratio of the first current transformer is chosen to be about 25:1 and the conversion ratio of the second current transformer is chosen to be about 200:1 having also just a single turn in the primary.

Using two current transformers connected in series to form the two stage current sensing device further has the advantage that a high conversion ratio may be achieved while the current sensing device possesses a high self-resonance frequency. This is preferred because the self-resonance frequency should be considerably higher than the operating frequency of the wireless power transmission arrangement to reduce disturbance and interference and to enhance efficiency. Preferably, the current sensing device is configured such that its self-resonance frequency is at least ten times higher than the operating frequency. If the operating frequency is for example 30 kHz, the current sensing device is preferably configured to have a self-resonance frequency of at least 300 kHz.

The self-resonance frequency is proportional to the inverse of the square root of the inductivity L of the device, where L is proportional to $N^2$ with N being the number of turns of the transducers secondary winding.

Accordingly, to achieve a conversion ratio of for example 1000:1, a single stage current sensor would, assuming a single turn in the primary, require 1000 turns in the secondary. A two stage current sensor would for example have 10 turns in the secondary of the first stage and 100 turns in the secondary of the second stage—again assuming a single turn in the primaries. The resulting overall self-resonance frequency of the two stage current sensor would therefore be essentially higher than that of the single stage device.

In a wireless power transfer arrangement for wireless charging of a high capacity battery with high c-rates, the conductor carrying the current usually has a rather high cross section. Such conductors are often provided in the form of foil conductors, also designated as sheet conductors hereinafter. Such foil conductors usually have a generally rectangular cross section with a much larger width than thickness. Their width is preferably at least 50 times larger than their thickness.

Typically, such conductors have a thickness of some 10th of a mm, for example a thickness of 0.1-0.5 mm, and a width of several 10 mm, for example a width of 40-100 mm. Depending on the expected amount of current such conductors may also be thicker and broader or thinner and narrower.

In a preferred embodiment of the invention, the first stage current sensor is optimized to sense the current in such a foil conductor. The term optimized in this respect primarily denotes a mechanical optimization. It may however also denote an electrical optimization. Hereinafter, the term transducer is sometimes used instead of the term current transformer.

The magnetic core of such an optimized first transducer includes two rods arranged in parallel and on different sides of the conductor carrying the AC current. Accordingly, this conductor forms the primary winding of the first transducer and a magnetic field is induced by the AC current around the conductor. The two rods are arranged to be within that magnetic field. They are made of a material with a high magnetic permeability, for example of ferrite. The secondary winding of the first transducer in this embodiment includes two winding parts connected to each other. A first winding part is wound on the first rod and a second winding part is wound on the second rod where the winding parts are wound around the rods such that the current induced within the two winding parts flow in the same direction, i.e. they add up to form the secondary current of the first transducer.

In this way, the current flowing in the primary winding, i.e. in the conductor carrying the AC current, generates a magnetic field around the conductor which in turn induces a current flowing in the secondary winding that is proportional to the AC current within the conductor.

In a further preferred embodiment, the rods are longer than the width of the conductor and they are arranged perpendicular to a longitudinal direction of the conductor and such that they extend beyond the conductor on both sides. Further, the winding parts do not cover the ends of the rods such that the rods do form a core with a gap on each side. More preferably, the windings parts are wound around the rods such that there turns are within the range of the conductor. Or in other words, those parts of the rods that do extend beyond the conductor are free and do not carry a turn of the secondary winding.

Such a gapped core has a quite low self-inductance, hence a voltage applied to it leads to magnetizing currents. In this case however the voltage applied to the first transducer is very low. As outlined further below, the current sensing arrangement is typically followed by a rectifier for providing a rectified version of the sensed AC signal and that is used to determine the mean value of the sensed current signal as well as to generate the control signals for the controllable rectifier of the output stage. Accordingly, the second transducer reduces the reflected voltage from that rectifier by its conversion ratio. If the second transducer has a conversion ratio of 200, the reflected voltage is reduces from about 1-3 V down to 5-15 mV.

An advantage of such a transducer arrangement is, as mentioned above, that the self-resonance frequency of the current transducer is very high, typically at least 10 times higher than the operating frequency of the WL-charger.

It is more preferred that the single elements that form the transducer are chosen such that the resonance frequency of the current transducer is at least 20 or even more preferably about 30 times higher than the operating frequency of the WL-charger.

The second current transformer can be of any shape and has usually a higher number of secondary turns than the first current transformer. The second current transformer may for example be implemented as a standard ferrite core with two coils wound on it.

There are different methods for generating the control signals for controlling the controllable rectifier. The control arrangement may for example include analog-to-digital (A/D) converters to convert the current sense signal to a digital signal and a computing unit such as for example a microprocessor to determine the switching times for the switches of the synchronous rectifier and to control corresponding drive circuits based on the converted digital signal. Due to the digital components the costs would however increase.

In another preferred embodiment of the invention the control arrangement therefore includes a first comparator for sensing a level of the current sense signal, a second comparator for sensing a direction of the current sense signal, i.e. the sign of the sensed current, and a logic circuit adapted to combine the output of the first comparator and the output of the second comparator to control the controllable rectifier.

This results in an easy and cost-effective way to generate the control signals for the controllable rectifier.

In such an implementation, the current sensing arrangement preferably includes a passive full wave sense rectifier for rectifying an output of the current sensing device to enable the first comparator to sense the level of the output of the current sensing device. For this purpose, the first comparator is connected across a shunt that is connected across an output of the sense rectifier. And in order to sense the sign of the current the second comparator is connected across an input of the sense rectifier.

In a further preferred embodiment of the invention, the sense rectifier is a diode rectifier and the current sensing device is adapted to provide a current as the current sense signal. In the case of a full wave diode rectifier with two diodes in each branch, the input voltage of the sense rectifier is equal to the sum of the voltage across the shunt and twice the voltage across a diode of the rectifier. This results in a much more robust sensing of the sign of the current as the positive half wave of the rectifier input voltage is increased by twice the diode voltage and its negative half wave is decreased by twice the diode voltage resulting in much steeper slopes of the rectifier input voltage around the zero-crossing. Or in other words, the voltage drop of the diodes increases the signal-to-noise ratio and enables a more accurate and robust detection of the zero-crossing of the current to be sensed.

Instead of a passive full wave rectifier, which offers a low cost solution with a reduced filtering amount at its output, any other rectifying device may in general be used to provide a rectified version of the sensed current. For example a half wave rectifier such as a single diode but also full wave rectifiers with controlled switches may be used.

The controllable rectifier preferably includes multiple controllable switches such as for example MOSFETs. However, other kinds of electrically controllable switches such as other transistors, thyristors or triacs may be used as well.

In such a controllable rectifier the switches are usually grouped into at least two subsets wherein the logic circuit is adapted to provide a first control signal for a first subset of switches of the controllable rectifier and to provide a second control signal for a second subset of switches of the controllable rectifier. In case of a two switch rectifier, the logic circuit provides a first control signal for the first switch and a second control signal for the second switch.

The controllable rectifier is however preferably implemented as a full bridge rectifier having two parallel branches, where each branch includes two controllable switches in series. In such a rectifier the switches are controlled by pairs. The switches of a first diagonal including the upper switch of the first branch and the lower switch of the second branch form a first subset of switches and are controlled using the first control signal and the switches of a second diagonal including the lower switch of the first branch and the upper switch of the second branch form a second subset of switches and are controlled using the second control signal.

As outlined above, the first comparator senses the level of the output of the current sensing device. To do so, the first comparator is preferably adapted to provide a LOW signal at its output if the AC current flowing from the secondary resonator to the output stage is high and to provide a HIGH signal if the AC current is low. The AC current is designated as high in this connection if it is higher than a given threshold where the threshold preferably is chosen to be a fraction of the maximum output voltage of the sense rectifier. Accordingly, this comparator serves to determine the conduction angle, i. e. the angle at which a given switch is ON during one period.

The goal is to control the switches such as to achieve a conduction angle that is as large as possible in order to minimize losses. The conduction angle may however not be 180° as erroneous switching could be the result. Accordingly, the switches are preferably controlled such as to achieve a conduction angle between 120° and 180°, preferably between 150° and 179° and even more preferably between about 165° and 177°.

In a charger with an operating frequency of for example 50 kHz, a half cycle lasts 10 µs. To achieve a conduction of for example 170°, the switches may be switched ON about 150 ns to 300 ns after the zero-crossing and it may be switched OFF about 150 ns to 300 ns before the next zero-crossing.

As the current usually is a sinusoidal current, the level of the threshold is preferably chosen to be about 5% to 10% of the maximum amplitude of the output of the sense rectifier. Of course, the first comparator may also be adapted to provide different thresholds to switch the switches ON and OFF such that a switch is switched ON if the rectifier output reaches for example 6% of its maximum and that said switch is switched OFF if the rectifier output falls down to for example 9% of its maximum.

The second comparator detects the direction of the sensed current. Its result is used to determine the active diagonal of the synchronous rectifier. The second comparator therefore has to be positioned upstream, i. e. at the input or more generally, in front of the sense rectifier.

Preferably, the second comparator is adapted to provide a HIGH signal if the AC current is positive and to provide a LOW signal if the AC current is negative.

In a preferred embodiment of the invention with the two comparators as described above, the logic circuit is adapted to provide the first control signal for switching ON the first subset of switches and for switching OFF the second subset of switches if the first comparator provides a LOW signal at its output and the second comparator provides a HIGH signal at its output, the first control signal for switching OFF the first subset of switches and for switching ON the second subset of switches if both the first and the second comparator provide a LOW signal at its output and the first and the second control signal for switching OFF both the first and the second subset of switches if the first comparator provide a HIGH signal at its output, independent of the output signal of the second comparator.

Or in other words, the logic circuit is adapted to provide
the first control signal for switching ON the first subset of switches and for switching OFF the second subset of switches if the AC current is positive and high, i. e. above the threshold, the second control signal for switching ON the second subset of switches and for switching OFF the first subset of switches if the AC current is negative and high, i. e. above the threshold and the first and the second control signal for switching OFF the first and the second subset of switches otherwise, i. e. if the AC current is low, i. e. below the threshold.

It is however clear to one skilled in the art that the logic circuit could also be constructed in a different way, as long as it is matches the outputs of the comparators and produces the same output signals for controlling the controllable rectifier.

For example, the first comparator could also be adapted to provide a LOW signal at its output if the AC current is low and to provide a HIGH signal if the AC current is high. And the second comparator could be adapted to provide a HIGH signal if the AC current stage is negative and to provide a LOW signal if the AC current is positive.

In such a case, the logic circuit would have to be adapted to provide the first control signal for switching ON the first subset of switches and for switching OFF the second subset of switches if the first comparator provides a HIGH signal at its output and the second comparator provides a LOW signal at its output, the first control signal for switching OFF the first subset of switches and for switching ON the second subset of switches if both the first and the second comparator provide a HIGH signal at its output and the first and the second control signal for switching OFF both the first and the second subset of switches if the first comparator provides a LOW signal at its output, independent of the output signal of the second comparator.

As mentioned above, the current sense signal produced by the current sensing arrangement may also be used for power transfer control from the primary to the secondary of the wireless power transfer arrangement. Power transfer control may be based on any suitable measurement of a parameter that is representative of the current, voltage or power transferred to the load such as for example the DC current provided to the load or, as described above, the current flowing from the secondary resonator to the output stage.

The measured signal provided to the power control device may for example be the AC output of the current sensing device. This would however result in a more complicated controller as the sense signal would have to be processed by the controller to retrieve the information required to control the power transfer. The measured signal provided to the power control device may also be any other signal that is representative of the load current. But again, depending on the type or kind of signal provided to the power control there might be a certain need for processing of the received signal to retrieve the information required to accurately control the transfer of power from the primary to the secondary side and further to the load.

In order to simplify and enhance power transfer control the current signal provided to the power controller preferably is, in another preferred embodiment of the invention, generated such as to be representative of a mean value of the sensed AC current. In a further preferred embodiment of the invention, the current sensing arrangement therefore includes a mean value arrangement connected to the current sensing device for producing a mean value of the current sense signal that is representative of the mean value of the AC current flowing from the secondary resonator to the output stage. Accordingly, the power transfer controller is preferably adapted to control the wireless power transfer based on the mean value of the current sense signal.

The mean value of the sensed current signal might for example be determined by sampling the sensed signal, converting it to a digital signal with an analog-to-digital converter and a digital processor or the like to compute the mean value from the samples in a purely digital manner.

But in another preferred embodiment of the invention, the mean value arrangement includes a mean value rectifier for rectifying the current sense signal and a mean value filter connected to the output of the sense rectifier. The mean value filter turns the rectified AC output signal of the rectifier into a DC signal that is representative of the mean value of the output of the current sensing arrangement.

Accordingly, the mean value of the current sense signal is provided at an output of the mean value filter. The mean value filter accordingly provides at its output a current sense signal that is representative of a mean value of the AC current to be sensed. This mean value is therefore proportional to the current conducted to the battery. To avoid losses in the sense/mean value rectifier the conversion ratio of the Current transducer is preferably chosen to be rather high such as for example 1000:1 or more preferably even higher such as about 5000:1.

The mean value rectifier may be of any kind with either active elements such as controllable switches in the form of transistors or other transistor based semiconductor elements or with passive elements such as diodes. Of course mixed implementations are possible as well. The rectifier may also be a half wave or a full wave rectifier. In order to provide an accurate image of the sensed AC current, the rectifier preferably is a passive full wave rectifier including four diodes in a full-bridge configuration. Due to the low power present in the output of the current sensing arrangement, a synchronous rectifier with controlled switches is not necessary.

The mean value filter might include any type of filter for smoothing and/or filtering the rectifier output. A simple RC circuit with a series resistor and a parallel capacitor is preferred and reduces the ripple sufficiently to provide an accurate mean value of the sensed signal. However, in dependency of the particular application and the accuracy requirements other filters such as a single parallel capacitor or an LC circuit may be used.

The mean value rectifier may be implemented as an element additional to the above mentioned sense rectifier that is used in the circuit to generate the control signals for the controllable rectifier of the output stage.

In a further preferred embodiment of the invention, that sense rectifier is however used as the mean value rectifier as well. Accordingly, the output of the sense rectifier is connected to the mean value filter. This helps to reduce the number of elements necessary.

The invention further relates to a secondary side for a wireless power transfer arrangement including a secondary resonator for converting the power received through the magnetic field to a secondary AC power and an output stage for converting the secondary AC power to a DC output power. According to the invention, the secondary side includes the current sensing arrangement adapted to produce the current sense signal, the power transfer controller adapted to control the wireless power transfer based on the current sense signal and the control arrangement for controlling the controllable rectifier, wherein the current sensing arrangement includes the current sensing device adapted to produce the current sense signal by sensing the AC current flowing from the secondary resonator to the output stage and in that the control arrangement is adapted to control the controllable rectifier based on the current sense signal.

A current sensing device according to the invention for a wireless power transfer arrangement as described above is adapted to sense the AC current flowing from the secondary resonator of the wireless power transfer arrangement to the output stage of the wireless power transfer arrangement.

Preferred embodiments of the current sensing device according to the invention exhibit one or more of the features mentioned above.

In a preferred embodiment the current sensing device for example includes a first stage current sensing device and a second stage current sensing device linked to an output of the first stage current sensing device.

The solution of the invention regarding the method for a wireless power transfer is specified by the features of claim 16. The method includes the steps of
 a) converting an input power received at a power input of the primary side to a primary AC power using an input stage and receiving the primary AC power and inducing a magnetic field using a primary resonator
 b) converting the power received through the magnetic field to a secondary AC power using a secondary resonator and converting the secondary AC power to a DC output power using an output stage with a controllable rectifier,
 c) producing a current sense signal using a current sensing arrangement and controlling the power transfer based on the current sense signal using a power transfer controller and
 d) controlling the controllable rectifier using a control arrangement.

According to the invention, the method further includes the steps of
  e) producing the current sense signal by sensing an AC current flowing from the secondary resonator to the output stage using a current sensing device and
  f) controlling the controllable rectifier based on the current sense signal.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
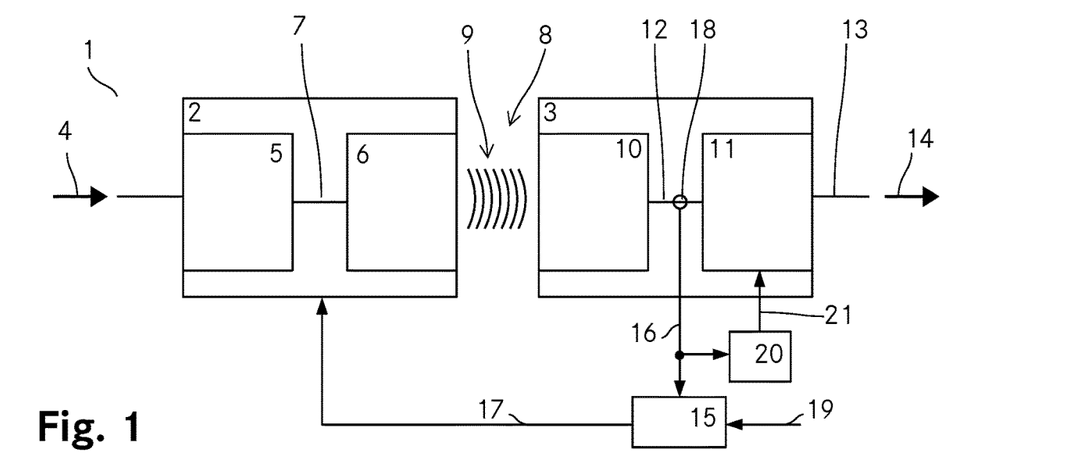
FIG. 1 a schematic representation of a wireless power transfer arrangement according to the invention.

FIG. 1 shows a schematic representation of a wireless power transfer arrangement 1 according to the invention. The wireless power transfer arrangement 1 includes a primary side 2, a secondary side 3 and a power transfer controller 15. The primary side 2 includes an input stage 5 for converting an input power 4 into an AC primary output power 7 which is fed to a primary resonator 6. The primary resonator 6 induces a magnetic field 9 to wirelessly transmit power across an airgap 8. The secondary side 3 includes a secondary resonator 10 which picks up the magnetic field 9 and converts the power received through the magnetic field 9 into an AC secondary output 12. An output stage 11 receives the AC secondary output 12 of the secondary resonator 10 and converts the AC secondary output 12 to a DC secondary output 13 which is then provided at an output of the wireless power transfer arrangement 1 as an output power 14.

The controller 15 controls the power transfer from the primary side 2 to the secondary side 3 over the airgap 8 and accordingly to a load connected to the DC secondary output 13 such as to meet the requirements of a particular application. The controller 15 controls the primary side 2 for example to meet a certain output power 14 needed by a device connected to the output stage 11. In case where the load for example includes a battery to be charged by the wireless power transfer arrangement 1, the controller 15 may for example receive a power set value from the load, for example a current set value 19 from the battery management system (BMS) of the load battery.

As the secondary side as well as the load/battery are usually arranged at, on or within the mobile device, i. e. in the vicinity of each other, they communicate with each other preferably via a wired communication link. In order to avoid unnecessary wiring, such communication link is preferably a wired bus communication system. Depending on the particular application, any suited bus system may be used, either standardized or not. Examples of such buses are HIPPI (High Performance Parallel Interface), IEEE-488, PC Card (PCMCIA), CAN bus (controller area network), eSATA, ExpressCard, Fieldbus, IEEE 1394 interface (FireWire), Lightning, RS-232, RS-485, Thunderbolt, USB (Universal Serial Bus) or any predecessor, variation or successor bus system of these bus systems as well as any other known bus system may be used. Further, any appropriate communication protocol may be used for communication using any of these buses. In vehicle or automation applications the CAN bus system in combination with the CANopen protocol is preferably used in connection with the invention.

The wireless power transfer arrangement 1 further includes a current sensing arrangement 18 for measuring the AC secondary output 12, in particular for measuring the current flowing from the secondary resonator 10 to the output stage 11. The current sensing arrangement 18 provides a current sense signal 16 to the controller 15 which, based on this current sense signal 16, generates control signals 17 to control the primary side 2 such as to induce a magnetic field 9 to meet the required output power 14.

Based on the current sense signal 16 and the current set value 19, the controller 15 determines the control signals 17 for the primary side 2. The controller 15 for example is configured to produce the control signals 17 by calculating the difference of the current set value 19 and the current sense signal 16.

The wireless power transfer arrangement 1 further includes a switching controller 20 for controlling the output stage 11, in particular for controlling the conversion of the AC secondary output 12 to the DC secondary output 13. That conversion is for example performed by a controllable rectifier. In such a configuration, the switch or switches of the controllable rectifier are controlled by control signals 21 provided by the switching controller 20 to the output stage 11. The switching controller 20 is adapted to produce these control signals 21 based on the current sense signal 16 that is also fed from the current sensing arrangement 18 to the switching controller 20.

Whereas the power transfer controller 15 and the switching controller 20 are shown to be separate units, they may also be implemented as a single controller unit. Or they may be integrated into any of the units shown in FIG. 1, either alone or in combination. Both controllers preferably are part of the secondary side of the wireless power transfer arrangement. Each of the controllers may also be split into further sub-units to separately control for example the frequency and the switches in the primary. Each of the controllers may also perform additional control functions of the wireless power transfer arrangement or even the function of other devices not shown.

The input stage 5 for example includes a converter arrangement for converting an input power 4 to the AC primary output power 7. In the case of an AC input power 4, the converter arrangement for example includes an AC/DC stage, a DC link and a DC/AC inverter. In such a configuration, the control signals 17 for example include the signals to control the input stage 5 by providing the control signals 17 for switching the switches of the inverter.

As outlined above, the power transfer controller 15 is usually implemented as a part of the secondary side wherefore the control signals 17 are to be transmitted to the primary side. In this example, the control signals 17 are transmitted to the primary side by means of a wireless communication technology such as for example Bluetooth or WLAN. The secondary as well as the primary side therefore includes a Bluetooth or WLAN transceiver to establish communication and in particular to transmit the control signals 17.

Figure 2:
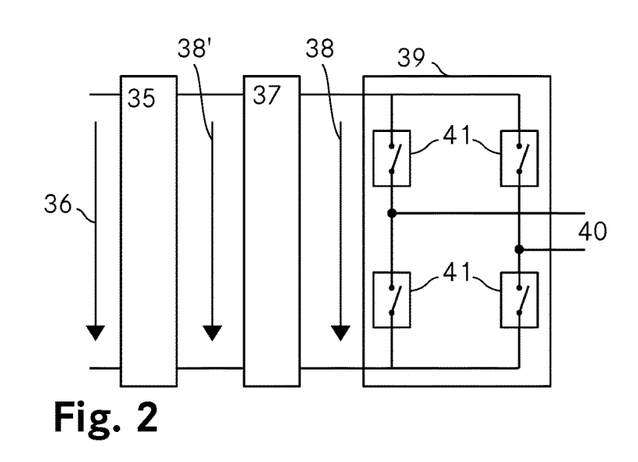
FIG. 2 a schematic representation of an input stage for a wireless power transfer arrangement according to the invention.

FIG. 2 shows a schematic representation of an exemplary embodiment of an input stage for a wireless power transfer arrangement according to the invention. The input stage is connected to an AC power source providing an AC input power 36. An AC/DC converter 35 converts the AC input power 36 to a fixed DC intermediate power 38' which then is converted by a DC/DC converter 37 to a variable DC intermediate power 38. The fixed DC intermediate power 38' may for example be power at 800 V and the variable DC intermediate power 38 may for example be a DC power between 0 V and 800 V, depending on the actual power need at the secondary. The variable DC intermediate power 38 is fed to an inverter 39 that converts the variable DC power 38 to an AC output power 40. For converting the variable DC intermediate power 38 to the AC output power 40, the inverter 39 includes four controllable switches 41 in a full bridge configuration. Soft switching may be used for an efficient operation of the inverter 39. Instead of providing an additional DC/DC stage between the AC/DC converter and the DC/AC inverter for controlling the voltage, the DC/AC inverter may be used for voltage control. In this case however soft switching may not be used anymore to switch the switches of the DC/AC inverter.

The frequency and the amount of power provided at the output power 40 can be controlled by controlling the switching of the switches 41, for example by a PWM (pulse width modulation) where not only the duty cycle but also the frequency of the pulses may be controlled.

Accordingly, to control the power transfer the frequency may be controlled by controlling the frequency of the inverter 39 and/or the variable DC intermediate power 38 at the input of the inverter 39. Control of the frequency of the inverter 39 and/or the variable DC intermediate power 38 is done based on the control signals which are typically received from the secondary side by means of a wireless transmission. The input stage may further include a controller (not shown) for providing the switch control signals for switching the switches 41 where the switch control signals are derived from the control signals received from the secondary side.

MOSFETs (metal oxide semiconductor field effect transistors) are often used as controllable switches in such converters and are also preferably used in the invention. However, other types and kinds of controllable switches such as other transistors, thyristors or triacs may be used.

The input stage may not only include those elements shown in FIG. 2, but usually also includes further elements such as filters etc. to optimise its operation.

Generally, different types of input stages may be used in a primary side for use in a wireless power transfer arrangement according to the invention as long as it converts the input power provided into a controllable AC output power.

Figure 3:
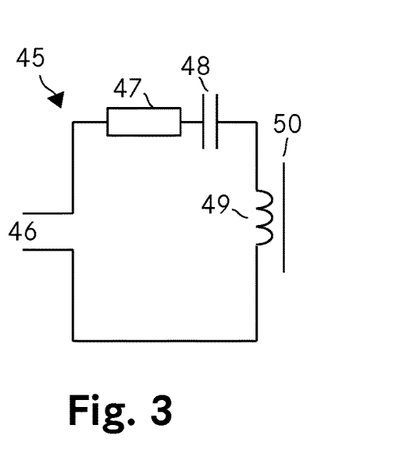
FIG. 3 a schematic representation of a primary resonator for a wireless power transfer arrangement according to the invention.

FIG. 3 shows a schematic representation of a primary resonator 45 for a wireless power transfer arrangement according to the invention. The primary resonator 45 may for example be connected to an input stage such as shown in FIG. 2. Accordingly, the primary resonator 45 receives an AC input power 46 at its input.

The primary resonator 45 essentially includes a tuned circuit with a resistor 47, a capacitor 48 and a coil 49 connected in series. By applying an AC power to the input of the primary resonator 45 the primary resonator 45 starts oscillating thereby inducing a magnetic field that is emitted into the zone around the resonator. The shape, the run and the distribution of the magnetic field lines may however be influenced by certain measures. So, one or more field guiding elements, here in the form of a magnetic core 50 are provided to direct the magnetic field into a direction as desired by the particular application. Usually, the magnetic field lines are modified such that most of the energy transferred into the magnetic field may be picked up by the receiving resonator in order to reduce or minimise losses.

Generally, the primary resonator may also include further or less elements and some or all of its elements may also be connected in parallel to form the resonating circuit for generating the magnetic field for power transmission.

Figure 4:
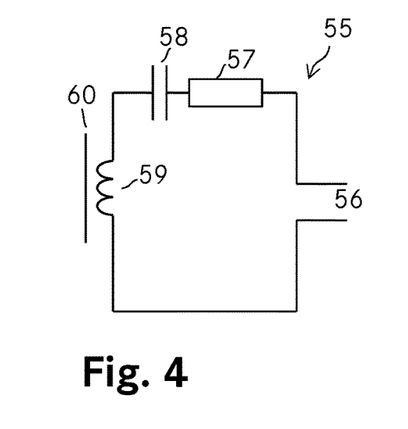
FIG. 4 a schematic representation of a secondary resonator for a wireless power transfer arrangement according to the invention.

FIG. 4 shows a schematic representation of a secondary resonator for a wireless power transfer arrangement according to the invention. The secondary resonator 55 may for example be used to pick up the magnetic field as generated by a primary resonator 45 such as shown in FIG. 3.

The secondary resonator 55 largely corresponds to the primary resonator 45. It essentially also includes a tuned circuit with a resistor 57, a capacitor 58 and a coil 59 connected in series. By properly arranging the secondary resonator 55 within the magnetic field produced by the primary resonator 45, it may pick up the energy transferred via the magnetic field and convert it to an AC output power 56 provided at its output. In order to pick up as much energy from the magnetic field, i. e. as much of the magnetic field lines as possible, the secondary resonator 55 also includes one or more flux guiding elements, here also in the form of a magnetic core 60.

Again, the secondary resonator may also include further or less elements and some or all of its elements may also be connected in parallel to form the resonating circuit for picking up the magnetic field.

Figure 5:
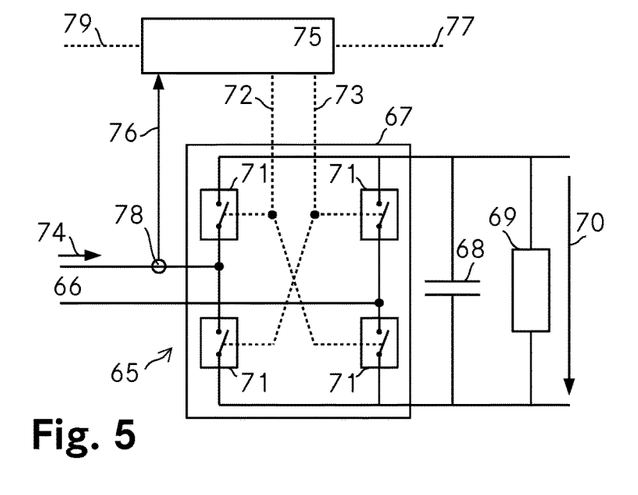
FIG. 5 a schematic representation of an output stage for a wireless power transfer arrangement according to the invention.

FIG. 5 shows a schematic representation of an output stage for use in a wireless power transfer arrangement according to the invention.

The output stage includes an AC/DC converter 65 that is connected to the output of a secondary resonator such as for example the secondary resonator 55 shown in FIG. 4. The AC/DC converter 65 converts an AC power 66 received at its input to a DC output power 70 provided at its output. The AC power 66 for example includes a current 74 flowing into the AC/DC converter 65. In this embodiment of the invention, the AC/DC converter includes a synchronous rectifier 67 with four switches 71 in a full bridge configuration, followed by a bulk capacitor 68 and an output filter 69 to shape the DC output power 70. The AC/DC converter 65 may also include further elements not shown in FIG. 10. Accordingly, the DC output power 70 provides a DC current at a specific DC voltage.

In this example, the output stage is also shown to include a current sensing arrangement 78 and a controller 75 that receives a current set value 79. The current sensing arrangement 78 determines the current 74 and provides a current sense signal 76 to the controller 75. The controller 75 in this embodiment is a combined controller. It generates not only the control signal 77 that is fed to the primary side of a wireless power transfer arrangement in order to control the power transfer of the arrangement, where the control signal 77 is for example determined by calculating the difference of the current set value 79 and the current sense signal 76. The controller also generates the control signals 72, 73 for controlling the AC/DC converter 65 that converts the AC power 66 into the DC output power 70. So, the control signal 77 as well as the control signals 72, 73 are generated by the controller 75 in consideration of the current sense signal 76 provided by the current sensing arrangement 78.

The switches 71 are implemented using FETs (field effect transistors), where other switches such as other transistors may of course be used as well. The control signals 72, 73 are fed to the gate of the switches 71. As shown in FIG. 5, the control signal 72 is fed to the control input of the upper left and the lower right switch 71 of the rectifier 67 and the other control signal 73 is fed to the control input of the upper right and the lower left switch 71 of the rectifier 67. Accordingly and as known in the art, the diagonally arranged switches are controlled by the same control signal.

Generally, different types of converters may be used to convert the AC input provided by the secondary resonator into a DC output. The DC output may also be stepped up or down as required by the particular application. And it would also be possible to again convert the DC output into an AC output with given characteristics as required by the particular application.

Figure 6:
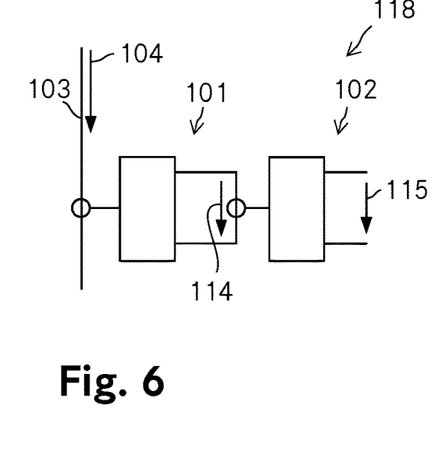
FIG. 6 a schematic representation of a current sensing arrangement for a wireless power transfer arrangement according to the invention.

FIG. 6 shows a schematic representation of a current sensing arrangement 118 for a wireless power transfer arrangement according to the invention. The current sensing arrangement 118 is a two stage current sensing arrangement 118 with a first stage current sensing device 101 and a second stage current sensing device 102. The first stage current sensing device 101 senses the current 104 flowing in a conductor 103 and provides an output signal that is representative of the current 104. In this case, the first stage current sensing device 101 provides an output current 114 that is representative of the current 104. Then the second stage current sensing device 102 senses that output current 114 of the first stage current sensing device 101 and provides an output signal that is representative of the current 114 and therefore also of the current 104. In this case, the second stage current sensing device 102 provides an output voltage 115 that is representative of the current 114 and therewith also of the current 104.

The first stage current sensing device 101 as well as the second stage current sensing device 102 is usually adapted to provide an output signal that is proportional to the sensed current. In this case the current 114 is accordingly proportional to the current 104 and the voltage 115 is proportional in the current 114 wherefore the voltage 115 also is proportional in the current 104.

Figure 7:
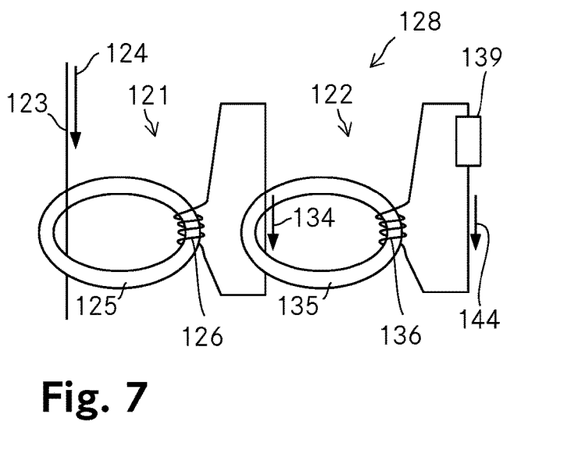
FIG. 7 a more detailed schematic representation of a current sensing arrangement for a wireless power transfer arrangement according to the invention.

FIG. 7 shows a more detailed schematic representation of a current sensing arrangement 128 for a wireless power transfer arrangement according to the invention. In this example, the current sensing arrangement 128 again is a two stage current sensing arrangement 128 where the first stage current sensing device is a current transformer 121 and where the second stage current sensing device is a current transformer 122 as well.

The first stage current transformer 121 senses the current 124 flowing in a conductor 123 and provides the output current 134 that is proportional to the current 124. The first stage current transformer 121 includes a closed loop magnetic core 125 where the conductor 123 is fed through the closed loop magnetic core 125 to form a primary winding of the first stage current transformer 121. The current 124 flowing in the conductor 123 thereby induces a magnetic flux within the magnetic core 125. The first stage current transformer 121 further includes a secondary winding 126 that is wound around the closed loop magnetic core 125 and where the ends of the secondary winding 126 are connected to each other. Accordingly, the magnetic flux flowing within the magnetic core 125 induces a current 134 flowing through the secondary winding 126.

The second stage current transformer 122 in this example is rather similar to the first stage current transformer 121. The second stage current transformer 122 senses the current flowing in a conductor and provides an output current that is proportional to the sensed current.

The second stage current transformer 122 includes a closed loop magnetic core 135 where the secondary winding 126 of the first stage current transformer 121 is fed through the closed loop magnetic core 135 to form the primary winding of the second stage current transformer 122. The current 134 flowing in the secondary winding 126 thereby induces a magnetic flux within the magnetic core 135. The second stage current transformer 122 further includes a secondary winding 136 that is wound around the closed loop magnetic core 135 and where the ends of the secondary winding 136 are connected to the ends of a resistor 139. Accordingly, the magnetic flux flowing within the magnetic core 135 induces a current 144 flowing through the secondary winding 136 and the resistor 139. Accordingly, the second stage current transformer 122 senses the current 134 flowing in the secondary winding 126 and provides an output current 144 that is proportional to the current 134. And since the current 134 is proportional to the current 124 flowing in the conductor 123 the current 144 also is proportional to the current 124. The output of the current sensing arrangement 128 may either be the current 144 or it may also be the voltage across the resistor 139. Further, the output of the current sensing arrangement 128 may also be provided as the voltage across a capacitor connected between the ends of the secondary winding 136. In another example the ends of the secondary winding 136 may be provided as the output of the current sensing arrangement 128 to a subsequent circuit.

The closed loop magnetic core 125 as well as the closed loop magnetic core 135 is shown in FIG. 7 to be a ring core, particularly a toroidal core. However, the magnetic cores do neither have to be identical to each other nor do they have to be a ring core. The closed loop magnetic cores may have any shape as long as they allow a magnetic flux to circulate within the core. Accordingly, rectangular cores may be used as well. And the core may be realised with or without an airgap such as for example shown in FIG. 8.

Figure 8:
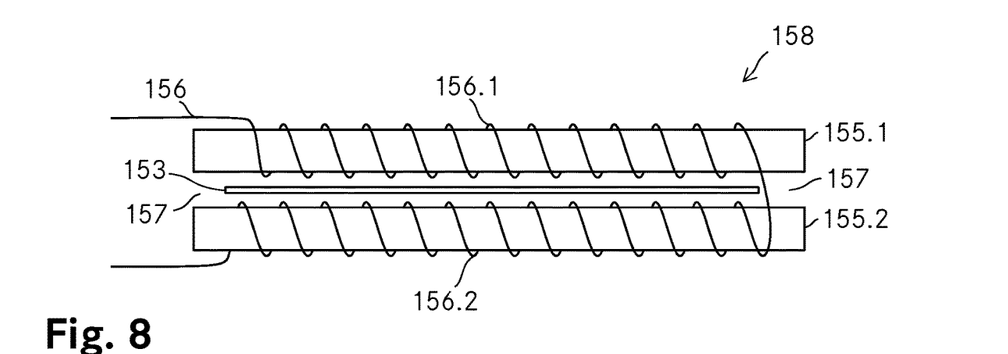
FIG. 8 a schematic representation of a first current sensing device for a wireless power transfer arrangement according to the invention.

FIG. 8 shows a schematic representation of a first stage current transformer 158 of use in a wireless power transfer arrangement according to the invention. The current transformer 158 for example is used as the first stage current sensing device for use in the invention.

The current transformer 158 is accordingly adapted to sense the current flowing in a conductor of the secondary side of a wireless power transfer arrangement according to the invention, particularly the current flowing in the conductor that carries the current flowing from the secondary resonator to the output stage. In such a wireless power transfer arrangement the current flowing from the secondary resonator to the output stage is usually a high current wherefore this conductor often is realised as a foil conductor 153. FIG. 8 shows a cross section of the foil conductor 153 wherefore the current flowing in the foil conductor is flowing perpendicular to the drawing plane.

The magnetic core of the current transformer 158 includes two rods 155.1, 155.2 where the first rod 155.1 is arranged on the upper side of the foil conductor 153 and where the second rod 155.2 is arranged on the lower side of the foil conductor 153. Both rods 155.1, 155.2 are shown to be arranged in parallel to the drawing plane which means that they are arranged perpendicular to the longitudinal direction of the foil conductor 153.

Both rods 155.1, 155.2 are longer than the width of the foil conductor 153 such that an airgap 157 results between the ends of the two rods 155.1, 155.2 on both sides of the foil conductor 153.

The foil conductor therefore forms the primary winding of the current transformer 158. The secondary winding 156 is formed by a first coil 156.1 wound around the first rod 155.1 and a second coil 156.2 wound around the second rod 155.2 where the first coil 156.1 and the second coil 156.2 are connected to each other or even wound on the rods 155.1, 155.2 using a single wire. The first coil 156.1 and the second coil 156.2 are wound around the rods 155.1, 155.2 such that the currents induced within these coils add up.

Whereas the primary winding of the current transformer 158, the foil conductor 153, includes a single turn, the secondary winding 156 is shown to include 24 turns where the first coil 156.1 includes half of the turns and where the second coil 156.2 includes half of the turns. So, the current transformer 158 has a conversion ratio of about 24:1.

In order to arrive at an overall conversion ratio of about 5000:1 with a current sensing arrangement having the current transformer 158 as its first stage current sensing device, the second stage current sensing device has to have a conversion ratio of about 208:1. The second stage current sensing device may for example be a current sensor as the one shown in FIG. 7 with about 210 turns in the secondary.

Figure 9:
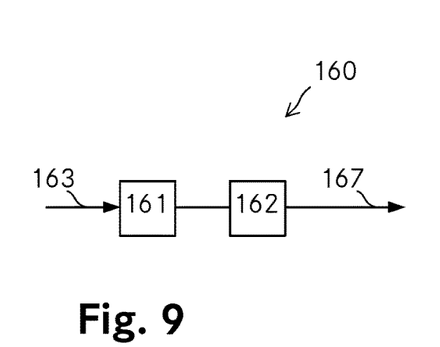
FIG. 9 a schematic representation of a circuit for producing a current sense signal for controlling the wireless power transfer.

FIG. 9 shows a schematic representation of a circuit 160 for producing a current sense signal for controlling the wireless power transfer. The circuit 160 includes a rectifier 161 and a filter 162 connected to the output of the rectifier 161. The rectifier 161 receives the sensed current signal 163. The rectifier 161 for example is connected to the output of a current sensing arrangement as shown in FIG. 6 or 7 where the sensed current signal 163 may be in the form of a current or a voltage.

The sensed current signal 163 is provided as a current that is fed to the rectifier 161.

The rectified output of the rectifier 161 is fed to filter 162 for smoothing and/or filtering the rectifier output such as to provide a mean value of the sensed current signal 163 at the filter output. The rectifier 161 for example includes a simple four-diode full-bridge rectifier and the filter 162 for example includes a RC filter with a series circuit of a resistor and a capacitor where the mean value is provided across the capacitor. This mean value therefore represents the current flowing from the secondary resonator to the output stage and is designated as the current sense signal 167. This current sense signal may then be fed to the controller for controlling the power transfer of a power transfer arrangement according to the invention.

Figure 10:
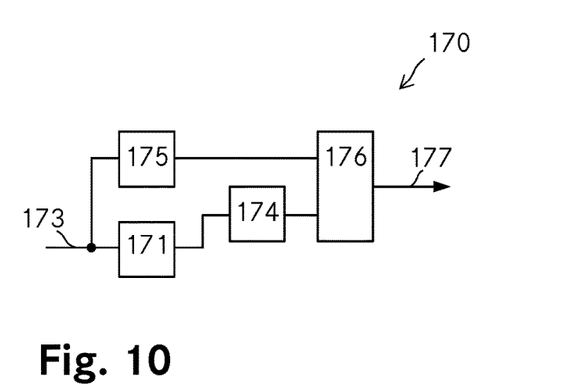
FIG. 10 a schematic representation of a control arrangement for controlling the controllable rectifier.

FIG. 10 shows a schematic representation of a control arrangement 170 for controlling the controllable rectifier of the output stage. The control arrangement 170 includes a rectifier 171, a first comparator 174, a second comparator 175 and a logic circuit 176.

The rectifier 171 receives the sensed current signal 173 which again is provided as a current. The rectifier 171 for example is connected to the output of a current sensing arrangement as shown in FIG. 6 or 7—similar to the rectifier 161 as shown in FIG. 9.

The first comparator 174 is connected to the output of the rectifier 171 and compares the rectified output to a threshold to provide a specified output signal that is representative of the level of the sensed current signal 173. The first comparator 174 for example provides a high signal at its output if the rectifier output is above a certain voltage level. Or the first comparator 174 provides a low signal at its output if the rectifier output is above that voltage level.

The sensed current signal 173 is also fed to the second comparator 175 which compares the sensed current signal 173 to another threshold to determine whether the sensed current signal 173 is currently in its negative or in its positive half wave. The second comparator 175 for example provides a high signal at its output if the sensed current signal 173 is in its negative half wave and it provides a low signal at its output if the sensed current signal 173 is in its positive half wave—or vice versa.

Then, the output of each comparator 174 and 175 is fed to a logic circuit 176 which then produces the control signals 177 for controlling the switches of the controllable rectifier in the output stage of the secondary side of a wireless power transfer arrangement according to the invention.

Accordingly, the first comparator 174 determines at which angle the switches are switched on and off and the second comparator 175 determines which switches of the controllable rectifier are to be switched on and off. In the case of a full bridge rectifier the second comparator determines, which diagonal of the switches is to be switched on and off.

Figure 11:
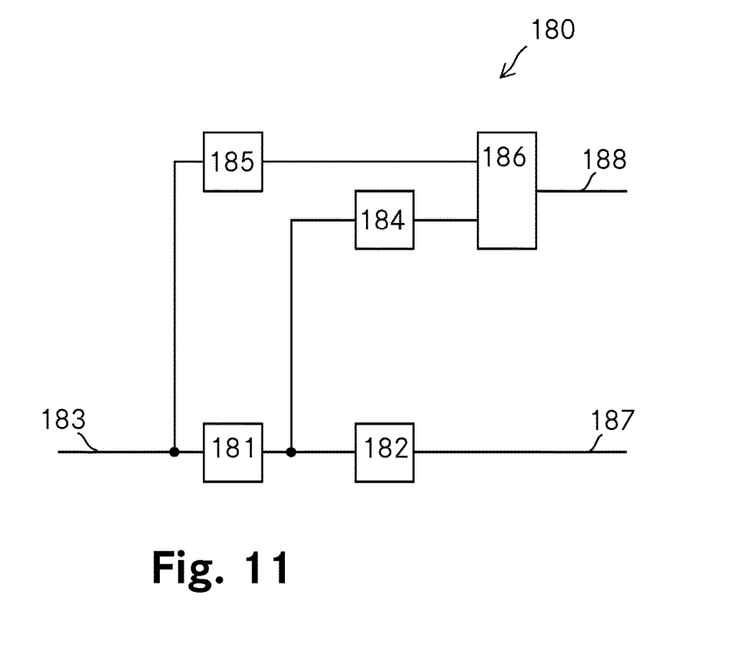
FIG. 11 a schematic representation of a combined circuit for producing a current sense signal for controlling the wireless power transfer and a control arrangement for controlling the controllable rectifier and FIG. 12 a more detailed schematic representation of the combined circuit shown in FIG. 11.

FIG. 11 shows a schematic representation of a control circuit 180 for producing a current sense signal for controlling the wireless power transfer and for controlling the controllable rectifier. The control circuit is a combination of the circuit 160 shown in FIG. 9 and the control arrangement 170 shown in FIG. 10 where the control circuit 180 just includes a common rectifier for both circuits.

The control circuit 180 includes a single rectifier 181 and a filter 182 for smoothing and filtering the output of the rectifier 181. The rectifier 181 receives the sensed current signal 183 as described in connection with FIG. 9. Then, the sensed current signal 183 is rectified by the rectifier 181 and filtered by the filter 182 such as to provide the current sense signal 187 at the filter output. The current sense signal 187 may then be fed to the controller for controlling the power transfer of a power transfer arrangement according to the invention.

Further, the control circuit 180 includes a first comparator 184, a second comparator 185 and a logic circuit 186. Similar to the control circuit 170 shown in FIG. 10, the first comparator 184 determines at which angle the switches are switched on and off and the second comparator 185 determines which switches of the controllable rectifier are to be switched on and off. And the logic circuit 186 produces the control signals 188 for the switches of the controllable rectifier in the output stage of the secondary side.

Figure 12:
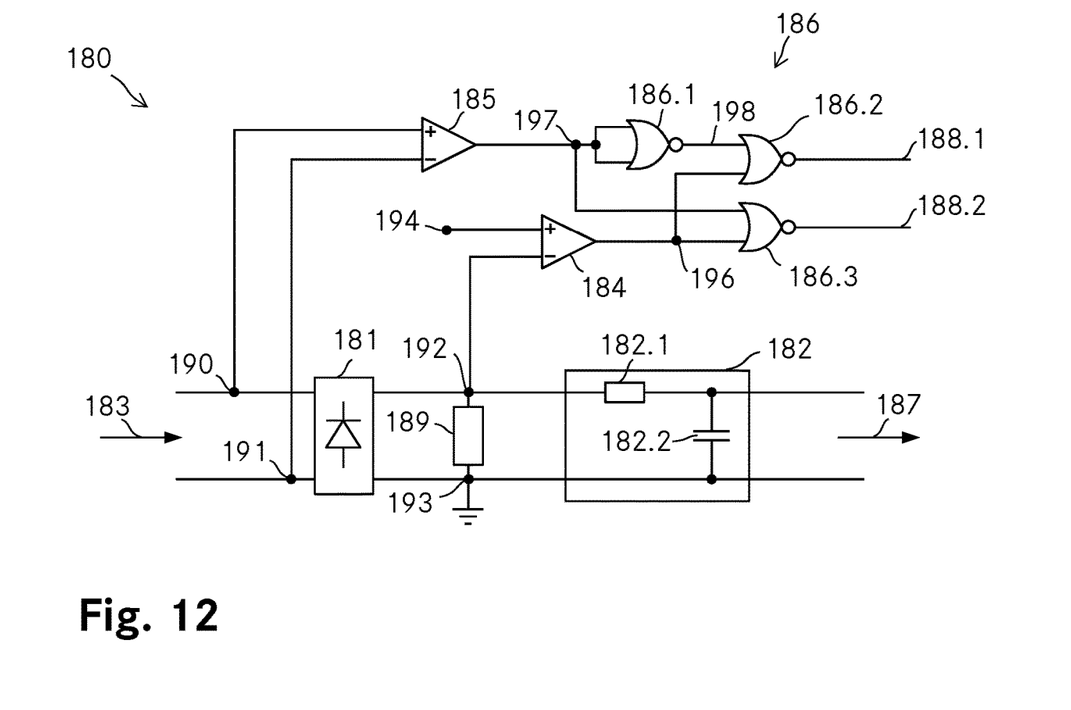

FIG. 12 shows a more detailed schematic representation of the combined circuit 180 shown in FIG. 11. The sensed current signal 183 is fed to the rectifier 181 in the form of a current. The rectifier 181 in this example is a simple diode rectifier with four diodes in a full bridge configuration. The output of the rectifier 181 is fed to the filter 182 which is an RC filter with a series circuit of a resistor 182.1 and a capacitor 182.2 connected across the output terminals of the rectifier 181. The resistor may also be split into two resistors connected on both sides of the capacitor 182.2. The voltage across the filter 182 corresponds to the mean value of the sensed current signal 183 and accordingly also to the sensed AC current flowing from the secondary resonator to the output stage of the power transmission arrangement. This mean value across the filter 182 output forms the current sense signal 187 that is fed to the controller of the power transmission arrangement to enable control of the transferred power based on the sensed AC current.

The combined circuit 180 may also include an additional scaling element connected to the output of the filter 182 such as to provide the current sense signal 187 with a suitable level for the power transmission controller. Such a scaling stage may for example include a differential amplifier to multiply the current sense signal 187 with a suitable factor such that the current sense signal 187 meets the requirements regarding the controller input.

The combined circuit 180 further includes a shunt 189 connected across the output of the rectifier 181 to determine the rectifier output voltage. The positive terminal 192 of the shunt 189 is connected to the inverting terminal of the first comparator 184 and a reference voltage 194 is connected to the non-inverting terminal of the comparator 184. The output 196 of the comparator 184 therefore goes low when the voltage at the inverting terminal of the comparator 184 becomes higher than the voltage at the non-inverting terminal of the comparator 184 and it is high otherwise.

Additional elements may be connected to one or both terminals of the comparator 184 or within the connecting lines of the terminals of the shunt 189 or the reference voltage 194 to the input terminals of the comparator 184 to ensure that the comparator input signals have an appropriate level to be suitably comparable to each other. For example, a resistor may be provided in the connecting line of the positive terminal 192 of the shunt 189 to the inverting terminal of the comparator 184. And the reference voltage 194 may for example be provided by a suitable voltage source. Or a voltage divider from the supply voltage of the comparator 184 to ground, for example the negative terminal 193 of the shunt 189, may be used to generate the reference voltage 194.

As the first comparator 184 determines the turn-on and turn-off times of the switches of the controllable rectifier in the output stage, the comparator 184 output indicates at which times the rectified voltage value of the sensed current signal 183 is higher than a given threshold. The additional circuits are therefore chosen such that the comparator 184 output 196 goes low when the sensed current signal 183 becomes high, i. e. higher than the threshold and it goes high when the sensed current signal 183 becomes low, i. e. falls below the threshold. Accordingly, the positive terminal of the shunt 189 is for example fed via a resistor directly to the inverting terminal of the comparator 184 but a voltage divider is provided between the negative terminal of the shunt 189 and the non-inverting terminal of the comparator 184 to suitably adjust the threshold. The choice of the threshold directly affects the conduction angle of the switches. The particular values of the elements of the additional circuits are therefore chosen in the dependency of the application and the choice of the other elements such as the comparators. They are then chosen such as to achieve a reasonable conduction angle, for example a conduction angle of about 170°.

The sensed current signal 183 is provided to the combined circuit 180 as a current flowing into the combined circuit 180. The positive input terminal 190 is fed to the non-inverting terminal of the comparator 185 and the negative input terminal 191 is fed to the inverting terminal of the comparator 185. The output 197 of the comparator 185 therefore goes low when the voltage at the non-inverting terminal of the comparator 184 becomes higher than the voltage at the inverting terminal of the comparator 184 and it is high otherwise.

Again, additional elements may be connected to one or both inputs of the comparator 185 or within the connecting lines from the positive input terminal 190 or from the negative input terminal 191 to the input terminals of the comparator 185 to ensure that both comparator input signals have an appropriate level to be suitably comparable to each other. For example, a resistor may be provided in the connecting line of the positive and/or negative terminal 190, 191 to the input terminals of the comparator 185 or a voltage divider may be provided between a supply voltage and one or both of the terminals 190, 191 to provide input signals to the comparator 184 inputs with a suitable level for comparison.

The second comparator 185 determines which of the switches of the controllable rectifier are to be switched on and off. It is accordingly adapted to detect the zero crossings of the input signal by directly comparing the voltages at the non-inverting and the inverting terminal to each other.

The additional circuits are therefore chosen such that the comparator 185 output 197 goes high when the sensed current signal 183 becomes positive and such that the comparator 185 output 197 goes low when the sensed current signal 183 becomes negative. Accordingly, two generally identical voltage dividers are used to feed the input terminals 190, 191 to the terminals of the comparator 185 with possibly a minor difference in the voltage division to enable hysteresis and/or small delays until a change of the comparators 185 output level.

The logic circuit 186 combines the outputs 196, 197 of the two comparators 184, 185 to provide the control signals 188.1, 188.2. The logic circuit 186 typically includes a number of logic gates which are preferably chosen to be identical. In the example of FIG. 12, the logic circuit 186 includes three NOR gates 186.1, 186.2, 186.3.

The first NOR gate 186.1 receives the doubled output 197 of the second comparator 185 and therefore provides a low output 198 if the output 197 of the second comparator 185 is high and it provides a high output 198 if the output 197 of the second comparator 185 is low.

The second NOR gate 186.2 receives the output of the first NOR gate 186.1 and the output 196 of the first comparator 184 and therefore provides a high output 188.1 if both the output of the first NOR gate 186.1 and the output 196 of the first comparator 184 are low and it provides a low output 188.1 otherwise.

The third NOR gate 186.2 receives the output of the output 196 of the first comparator 184 and the output 197 of the second comparator 185. It therefore provides a high output 188.2 if both the output 196 of the first comparator 184 and the output 197 of the second comparator 185 are low and it provides a low output 188.2 otherwise. For example, the control signal 188.1 is used to control a first diagonal of a synchronous full bridge power rectifier as shown in FIG. 5 and the control signal 188.2 is used to control a second diagonal of such a synchronous full bridge power rectifier, where the first diagonal includes the upper left and the lower right switch and the second diagonal includes the upper right and the lower left switch of the synchronous full bridge power rectifier.

This result in the following truth table for the control signals 188.1, 188.2:

| $V_{189}$ | output 196 | $V_{183}$ | output 197 | signal 188.1 | signal 188.2 |
|---|---|---|---|---|---|
| high | low | positive | high | high | low |
| high | low | negative | low | low | high |
| low | high | positive | high | low | low |
| low | high | negative | low | low | low |

$V_{183}$ thereby designates the voltage of the sensed current signal 183 and $V_{189}$ designates the voltage across the shunt 189 where "high" in connection with $V_{189}$ means that $V_{189}$ is higher than the threshold and where "low" means that $V_{189}$ is lower than the threshold.

A "low" value of the control signals 188.1, 188.2 means that the corresponding switches are switched OFF and a "high" value means that they are switched ON. The "high" value for example corresponds to the positive supply voltage of the comparator and the "low" value for example corresponds to the negative supply voltage of the comparator.

As is clear for one skilled in the art, one or both of the comparators may also be connected to the current sensor output or the sense rectifier output respectively in different ways such that their output signals are inverted. In such a case the logic circuit as to be adapted accordingly to deliver proper control signals for the rectifier switches.

In summary, it is to be noted that the invention enables to create a wireless power transfer arrangement with an enhanced synchronous rectifier control resulting in less switching errors and reduced losses thereby also having a reduced number of elements as some modules such as the power transfer controller as well as the synchronous rectifier controller make use of common elements such as the sense rectifier.

The invention claimed is:

1. A wireless power transfer arrangement for a wireless power transfer from a primary side across an airgap to a secondary side by inductive coupling, wherein
   a) the primary side includes a power input for receiving an input power, an input stage for converting the input power to a primary AC power and a primary resonator for receiving the primary AC power and inducing a magnetic field,
   b) the secondary side includes a secondary resonator for converting the power received through the magnetic field to a secondary AC power and an output stage for converting the secondary AC power to a DC output power,
   c) the output stage includes a controllable rectifier for converting the secondary AC power to the DC output power,
   d) the wireless power transfer arrangement further includes
      a current sensing arrangement adapted to produce a current sense signal, wherein the current sensing arrangement includes a current sensing device adapted to produce the current sense signal by sensing an AC current flowing from the secondary resonator to the output stage,
      a power transfer controller adapted to control the wireless power transfer based on said current sense signal and
      a control arrangement adapted to control the controllable rectifier based on the current sense signal,
      wherein the current sensing device includes a first stage current sensing device and a second stage current sensing device linked to an output of the first stage current sensing device, wherein the first stage current sensing device includes a first current transformer and the second stage current sensing device includes a second current transformer, wherein the first current transformer and the second current transformer are connected in series.

2. The wireless power transfer arrangement according to claim 1, wherein the first stage current sensing device includes a first current transformer having a first conversion ratio between 10:1 and 80:1, preferably between 15:1 and 50:1 and even more preferably between 20:1 and 30:1 and wherein the second stage current sensing device includes a second current transformer having a second conversion ratio between 20:1 and 600:1, preferably between 100:1 and 300:1 and more preferably between 150:1 and 250:1, wherein the first conversion ratio and the second conversion ratio are chosen such that the current sensing device has an overall conversion ratio between 100:1 and 30'000:1, preferably between 500:1 and 15'000:1 and more preferably between 2000:1 and 10'000:1.

3. The wireless power transfer arrangement according to claim 2, wherein the first current transformer includes a magnetic core and a secondary winding, wherein the magnetic core includes two rods of a material with a high magnetic permeability.

4. The wireless power transfer arrangement according to claim 3, wherein the magnetic core includes two rods of ferrite arranged in parallel and on different sides of a conductor carrying the AC current flowing from the secondary resonator to the output stage such that the conductor forms a primary winding of the first current transformer, and wherein the secondary winding includes a first winding part wound on the first rod and a second winding part wound on the second rod and connected to the first winding part.

5. The wireless power transfer arrangement according to claim 4, wherein the conductor includes a foil conductor.

6. The wireless power transfer arrangement according to claim 1, wherein the control arrangement includes a first comparator for sensing a level of the current sense signal, a second comparator for sensing a direction of the current sense signal and a logic circuit adapted to combine an output of the first comparator and an output of the second comparator to provide one or more control signals for controlling the controllable rectifier.

7. The wireless power transfer arrangement according to claim 6, wherein the current sensing arrangement includes a sense rectifier for rectifying the current sense signal, wherein the first comparator is connected across a shunt that is connected across an output of the sense rectifier and wherein the second comparator is connected across an input of the sense rectifier.

8. The wireless power transfer arrangement according to claim 5, wherein the controllable rectifier includes multiple controllable switches and wherein the logic circuit is adapted to provide a first control signal for a first subset of switches of the controllable rectifier and to provide a second control signal for a second subset of switches of the controllable rectifier.

9. The wireless power transfer arrangement according to claim 5, wherein the first comparator is adapted to provide a LOW signal if the AC current flowing from the secondary resonator to the output stage is high and to provide a HIGH signal if the AC current flowing from the secondary resonator to the output stage is low.

10. The wireless power transfer arrangement according to claim 5, wherein the second comparator is adapted to provide a HIGH signal if the AC current flowing from the secondary resonator to the output stage is positive and to provide a LOW signal if the AC current flowing from the secondary resonator to the output stage is negative.

11. The wireless power transfer arrangement according to claim 5, wherein the logic circuit is adapted to provide the first control signal for switching ON the first subset of switches and for switching OFF the second subset of switches if the AC current flowing from the secondary resonator to the output stage is positive and above a threshold, to provide the second control signal for switching ON the second subset of switches and for switching OFF the first subset of switches if the AC current flowing from the secondary resonator to the output stage is negative and above the threshold and to provide the first and the second control signal for switching OFF the first and the second subset of switches otherwise.

12. The wireless power transfer arrangement according to claim 1, wherein the current sensing arrangement includes a mean value arrangement connected to the current sensing device for producing a mean value of the current sense signal and wherein the power transfer controller is adapted to control the wireless power transfer based on the mean value.

13. The wireless power transfer arrangement according to claim 12, wherein the mean value arrangement includes a mean value rectifier for rectifying the current sense signal and a mean value filter connected to an output of the sense rectifier wherein the mean value is provided at an output of the mean value filter.

14. The wireless power transfer arrangement according to claim 1, further comprising a secondary side that includes:
the current sensing arrangement adapted to produce the current sense signal,
the power transfer controller adapted to control the wireless power transfer based on the current sense signal and
the control arrangement for controlling the controllable rectifier,
wherein the current sensing arrangement includes the current sensing device adapted to produce the current sense signal by sensing the AC current flowing from the secondary resonator to the output stage and in that the control arrangement is adapted to control the controllable rectifier based on the current sense signal.

15. The wireless power transfer arrangement according to claim 1, further comprising a current sensing device adapted to sense an AC current flowing from the secondary resonator of the wireless power transfer arrangement to the output stage of the wireless power transfer arrangement.

16. A method for a wireless power transfer from a primary side across an airgap to a secondary side by inductive coupling, including
a) converting an input power received at a power input of the primary side to a primary AC power using an input stage and receiving the primary AC power and inducing a magnetic field using a primary resonator,
a) converting the power received through the magnetic field to a secondary AC power using a secondary resonator and converting the secondary AC power to a DC output power using an output stage with a controllable rectifier,
b) producing a current sense signal using a current sensing arrangement and controlling the power transfer based on the current sense signal using a power transfer controller and
c) controlling the controllable rectifier using a control arrangement,
d) producing the current sense signal by sensing an AC current flowing from the secondary resonator to the output stage using a current sensing device, including sensing the AC current with a first stage current sensing device including a first current transformer and sensing a current at an output of the first stage current sensing device with a second stage current sensing device including a second current transformer, wherein the first current transformer and the second current transformer are connected in series, and
e) controlling the controllable rectifier based on the current sense signal.

* * * * *